(12) United States Patent
Lou et al.

(10) Patent No.: US 8,437,581 B2
(45) Date of Patent: May 7, 2013

(54) METHOD AND SYSTEM FOR INTERPOLATING FRACTIONAL VIDEO PIXELS

(75) Inventors: Jian Lou, San Diego, CA (US); David M. Baylon, San Diego, CA (US); Koohyar Minoo, San Diego, CA (US); Krit Panusopone, San Diego, CA (US); Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 13/406,613

(22) Filed: Feb. 28, 2012

(65) Prior Publication Data

US 2012/0224098 A1    Sep. 6, 2012

Related U.S. Application Data

(60) Provisional application No. 61/449,411, filed on Mar. 4, 2011.

(51) Int. Cl.
*G06K 9/32* (2006.01)

(52) U.S. Cl.
USPC .......................................... 382/300; 348/538

(58) Field of Classification Search .................. 382/300; 348/538
See application file for complete search history.

(56) References Cited

U.S. PATENT DOCUMENTS

| | | | |
|---|---|---|---|
| 5,511,137 A * | 4/1996 | Okada ............................ | 382/298 |
| 6,252,576 B1 * | 6/2001 | Nottingham .................. | 345/660 |
| 7,505,636 B2 * | 3/2009 | MacInnis et al. ............. | 382/300 |
| 7,660,471 B2 * | 2/2010 | Bjontegaard .................. | 382/232 |
| 7,778,494 B2 * | 8/2010 | Shastry et al. ................ | 382/300 |
| 7,965,177 B2 * | 6/2011 | Kobayashi et al. ........... | 340/461 |
| 2004/0062307 A1 * | 4/2004 | Hallapuro et al. ........ | 375/240.13 |
| 2008/0166068 A1 * | 7/2008 | Fuchigami .................... | 382/300 |
| 2008/0205793 A1 * | 8/2008 | Nilsson et al. ................ | 382/300 |
| 2009/0016634 A1 * | 1/2009 | Cox et al. ...................... | 382/260 |
| 2010/0246998 A1 * | 9/2010 | He et al. ........................ | 382/300 |
| 2012/0224639 A1 * | 9/2012 | Lou et al. ................. | 375/240.17 |

FOREIGN PATENT DOCUMENTS

| WO | 2006006609 A1 | 1/2006 |
|---|---|---|
| WO | WO 2006006609 A1 * | 1/2006 |

OTHER PUBLICATIONS

CE3: Fixed—by Motorola Mobility, Jian Lou et al., JVTVC-F576, Jul. 14-22, 2011, pp. 1-6.*
CE3:Experimental—by Samsung, Alshina et al., JCTVC-D344, Jan. 20-28, 2011, pp. 1-15.*
New DCT—filters, Jian Lou et al., JCTVC-D246, Jan. 20-28, 2011, pp. 1-8.*
Alishina E et al.: "CE3: Experimental results of DCTIF by Samsung", 4. JCT-VC Meeting; 95. MPEG Meeting; Daegu; (Joint Collaborative Team on Video Coding of ISO/IEC JTC1/SC29/WG11AND ITU-T SG.15), No. JCTVC-D344, Jan. 15, 2011, Section 2.

(Continued)

*Primary Examiner* — Jayesh A Patel

(57) ABSTRACT

A method and system for interpolating video pixels is described, in which the value of a first fractional pixel is calculated based on the values of the first set of integer pixels, while the value of a second fractional pixel is calculated based on the values of the second set of integer pixels. The first set of integer pixels is not equal to the second set of integer pixels. For example, the first and second set may contain different integer pixels and may contain different numbers of integer pixels.

4 Claims, 8 Drawing Sheets

(L5) (L4) (L3) (L2) (L1) (L0) (FL) (H) (FR) (R0) (R1) (R2) (R3) (R4) (R5)

OTHER PUBLICATIONS

Jian Lou et al.: "New DCT-based interpolation filters", 95. MPEG Meeting; Daegu; (Motion Picture Expert Group or ISO/IEC JTC1/SC29/WG11), No. m19007, Jan. 20, 2011, section 3.

Lou J et al.: "CE3: Slice-type based adaptive interpolation filter tests by Motorola Mobility", 6. JCT-VC Meeting; 97. MPEG Meeting; Torino; (Joint Collaborative Team on Video Coding of ISO/IEC JTC1/SC29/WG11 and ITU-T SG.16), No. JCTVC-F576, Jul. 7, 2011, Section 2.2.

Patent Cooperation Treaty, International Search Report and Written Opinion of the International Searching Authority for International Application No. PCT/US2012/027227, May 2, 2012, 13 pages.

* cited by examiner

METHOD AND SYSTEM FOR INTERPOLATING FRACTIONAL VIDEO PIXELS

CROSS REFERENCE TO RELATED APPLICATIONS

The present application claims the benefit of priority to U.S. Provisional Patent Application Ser. No. 61/449,411, filed on Mar. 4, 2011, entitled "High Efficiency Low Complexity Fractional Pixel Interpolation Filters," by Lou, et al., which is hereby incorporated by reference in its entirety.

The present application is related to U.S. patent application Ser. No. 13/408,609 filed on Feb. 29, 2012, entitled "A METHOD AND SYSTEM FOR INTERPOLATING HALF PIXELS AND QUARTER PIXELS," by Lou, et al.

TECHNICAL FIELD

The present invention relates generally to video image processing and, more particularly, to methods and systems for interpolating video pixels.

BACKGROUND

One of the major characteristics of conventional motion compensated hybrid video codecs is use of translational model for motion description. Pixel value of a digital video sequence represents the light intensity from certain object that falls into the detection range of some discrete sensor. Since an object motion is completely unrelated to the sampling grid, sometimes the object motion is more like a fractional-pel motion than a full-pel one. Therefore, most modern hybrid video coding standards use fractional-pel displacement vector resolution of ½-pel or ¼-pel.

In order to estimate and compensate fractional-pel displacements, the image signal on these fractional-pel positions has to be generated by interpolation process. The taps of an interpolation filter weight the integer pixels in order to generate the fractional-pel signals. The simplest filter for fractional-pel signal interpolation is bilinear filter, but there is no improvement beyond ⅛-pel (See Cliff Reader, "History of MPEG Video Compression", JVT of ISO/IEC MPEG and ITU-T VCEG, Docs. JVT-E066, October 2002). Therefore, only ½-pel resolution using bilinear interpolation is adopted in MPEG-2 and H.263.

Werner supposes the reason for poor performance of bilinear filter is that the Nyquist Sampling Theorem is not fulfilled and aliasing disturbs the motion compensated prediction. He proposes Wiener interpolation filters for reducing the impact of aliasing (See O. Werner, "Drift analysis and, drift reduction for multiresolution hybrid video coding," Signal Processing: Image Commun., vol. 8, no. 5, July 1996). Thus, recent video coding standards like MPEG-4 part 2 and H.264 apply 8-tap and 6-tap Wiener interpolation filters respectively. These filters are obtained by solving the Wiener-Hopf equations. The equations should be specified for filters with different filter length and the resultant taps are limited within a range while different video sequences are used as the input signals.

Generally, the interpolation process is realized by using weighted sum of the integer pixels to calculate the target fractional pixel values. A practical implementation is to use non-zero integer values as the weighting factors and apply right shift to save computational complexity with added shift offset. Clip operation might also be applied to keep the interpolated pixel values within the normal dynamic range.

Traditionally, the half-pel interpolation process uses an even number of integer pixels symmetric around a current half-pel position. The interpolation process for nearby quarter-pel or eighth-pel pixels employs the same set of integer pixels. This constraint on fractional-pel interpolation process is actually not necessary. Releasing this constraint can make the filter design more flexible, thus achieving better performance and/or lower complexity.

BRIEF DESCRIPTION OF THE DRAWINGS

Various embodiments of the present invention will be described below in more detail, with reference to the accompanying drawings.

It is to be noted, however, that the appended drawings illustrate embodiments of this invention and are therefore not to be considered limiting of its scope, for the invention may admit to other equally effective embodiments.

FIG. 6 illustrates a pixel line.

DETAILED DESCRIPTION

Figure 1A:
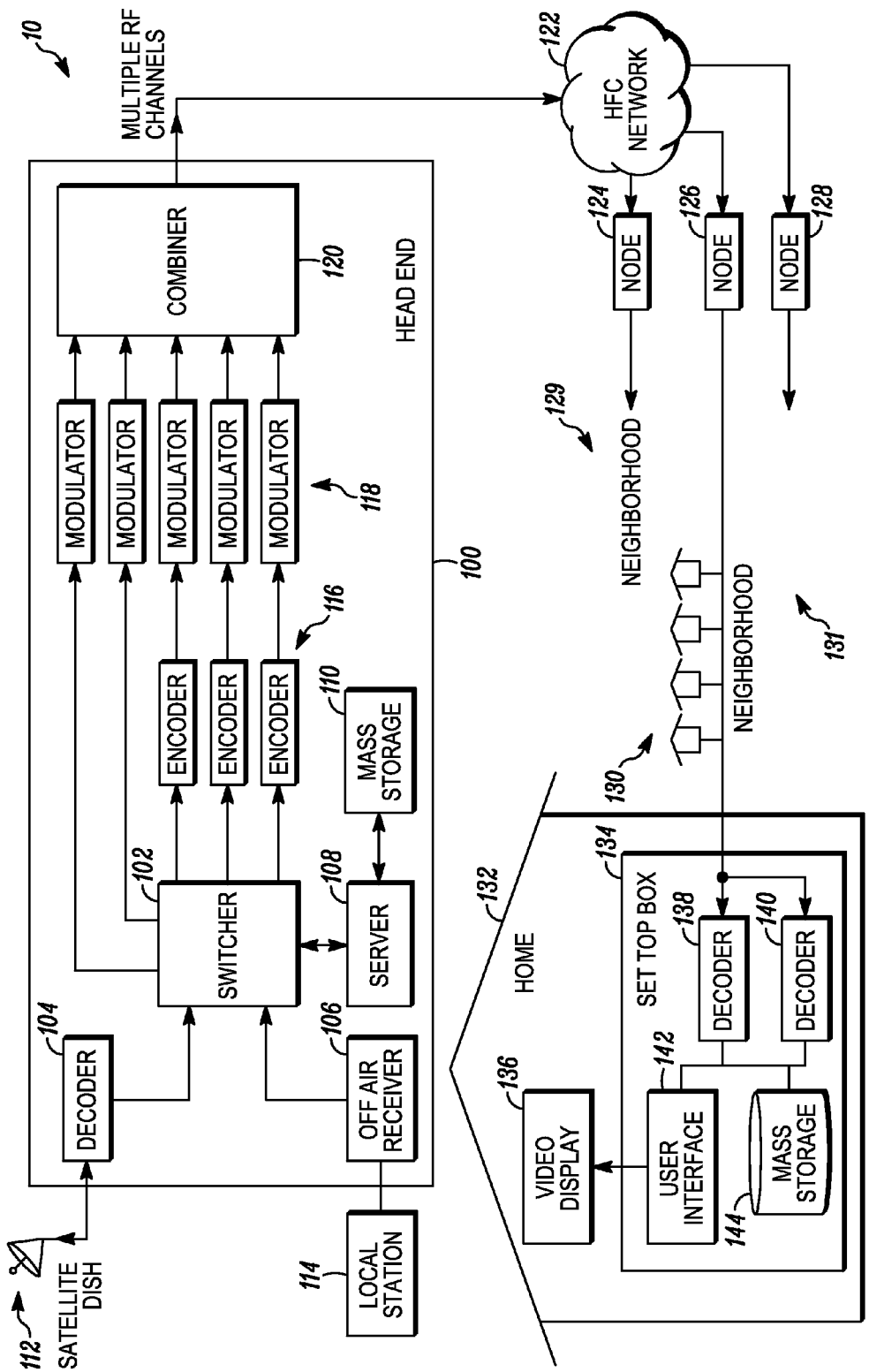
FIG. 1A is a video system in which the various embodiments of the invention may be used.

The invention is generally directed to a method and system for interpolating fractional pixels. According to one embodiment of the invention, a first fractional pixel and a second fractional pixel are located between a pair of adjacent integer pixels. A first set of integer pixels and a second set of integer pixels is selected. The value of the first fractional pixel is calculated based on the values of the first set of integer pixels, while the value of the second fractional pixel is calculated based on the values of the second set of integer pixels. In this embodiment, the first and second set of integer pixels are unequal. For example, the first and second set may contain different integer pixels and may contain different numbers of pixels. Also, the number of integer pixels in either or both of the first and second set may be odd.

In another embodiment of the invention, a first fractional pixel (FL), a half pixel (H) and a second fractional pixel (FR) are located between a pair of adjacent integer pixels along a pixel line. The value of the first fractional pixel (FL) is calculated based on the values of a first set of integer pixels along the line. The value of the half pixel (H) is calculated based on the values of a second set of integer pixels along the line. And the value of the second fractional pixel (FR) is calculated based on the values of a third set of integer pixels along the line. In this embodiment, the first, second and third sets of integer pixels are unequal.

In still another embodiment of the invention, the filter coefficients are chosen so that the intermediate data are kept within a specific dynamic range, depending on the bit-depth of input data to the filtering operation.

The embodiments of the invention described herein may support a number of different types of video materials. The most commonly used video materials are 8 bit data, that is, the value of each Luma or Chroma pixel is stored in 8 bit format. However, 10 bit, 12 bit or even higher bit-depth videos are becoming more and more popular these days. Moreover, Internal Bit-depth Increase (IBDI) is introduced in video codecs to maintain higher intermediate data accuracy, thus achieving better performance. On the other hand, lower dynamic range (16 bit, 32 bit) for the processors which video codecs are implemented on is favored to maintain an acceptable complexity. The increased bit-depth of input data to the filtering process might make the dynamic range exceed the favored range if the same interpolation filters used for the 8 bit input data are employed. For example, if the interpolation filter can operate under 16 bit dynamic range with 8 bit input data, it might need 18 bit dynamic range with 10 bit input data or with 10 bit Internal Bit-Depth Increase settings (2 bit up scaling). For general purpose processors, 18 bit dynamic range data needs to be handled under 32 bit settings.

An example of a video system in which an embodiment of the invention may be used will now be described. It is understood that elements depicted as function blocks in the figures may be implemented as hardware, software, or a combination thereof. Furthermore, embodiments of the invention may also be employed on other systems, such as on a personal computer. smartphone or tablet computer.

Referring to FIG. 1A, the video system, generally labeled 10, includes a head end 100 of a cable television network. The head end 100 is configured to deliver video content to neighborhoods 129, 130 and 131. The head end 100 may operate within a hierarchy of head ends, with the head ends higher in the hierarchy generally having greater functionality. The head end 100 is communicatively linked to a satellite dish 112 and receives video signals for non-local programming from it. The head end 100 is also communicatively linked to a local station 114 that delivers local programming to the head end 100. The head end 100 includes a decoder 104 that decodes the video signals received from the satellite dish 112, an off-air receiver 106 that receives the local programming from the local station 114, a switcher 102 that routes data traffic among the various components of the head end 100, encoders 116 that encode video signals for delivery to customers, modulators 118 that modulate signals for delivery to customers, and a combiner 120 that combines the various signals into a single, multi-channel transmission.

The head end 100 is also communicatively linked to a hybrid fiber cable (HFC) network 122. The HFC network 122 is communicatively linked to a plurality of nodes 124, 126, and 128. Each of the nodes 124, 126, and 128 is linked by coaxial cable to one of the neighborhoods 129, 130 and 131 and delivers cable television signals to that neighborhood. One of the neighborhoods 130 of FIG. 1A is shown in more detail. The neighborhood 130 includes a number of residences, including a home 132 shown in FIG. 1A. Within the home 132 is a set-top box 134 communicatively linked to a video display 136. The set-top box 134 includes a first decoder 138 and a second decoder 140. The first and second decoders 138 and 140 are communicatively linked to a user interface 142 and a mass storage device 144. The user interface 142 is communicatively linked to the video display 136.

During operation, head end 100 receives local and nonlocal programming video signals from the satellite dish 112 and the local station 114. The non-local programming video signals are received in the form of a digital video stream, while the local programming video signals are received as an analog video stream. In some embodiments, local programming may also be received as a digital video stream. The digital video stream is decoded by the decoder 104 and sent to the switcher 102 in response to customer requests. The head end 100 also includes a server 108 communicatively linked to a mass storage device 110. The mass storage device 110 stores various types of video content, including video on demand (VOD), which the server 108 retrieves and provides to the switcher 102. The switcher 102 routes local programming directly to the modulators 118, which modulate the local programming, and routes the non-local programming (including any VOD) to the encoders 116. The encoders 116 digitally encode the non-local programming. The encoded non-local programming is then transmitted to the modulators 118. The combiner 120 receives the modulated analog video data and the modulated digital video data, combines the video data and transmits it via multiple radio frequency (RF) channels to the HFC network 122.

The HFC network 122 transmits the combined video data to the nodes 124, 126 and 128, which retransmit the data to their respective neighborhoods 129, 130 and 131. The home 132 receives this video data at the set-top box 134, more specifically at the first decoder 138 and the second decoder 140. The first and second decoders 138 and 140 decode the digital portion of the video data and provide the decoded data to the user interface 142, which then provides the decoded data to the video display 136.

The encoders 116 and the decoders 138 and 140 of FIG. 1A (as well as all of the other steps and functions described herein) may be implemented as computer code comprising computer readable instructions stored on a computer readable storage device, such as memory or another type of storage device. The computer code is executed on a computer system by a processor, such as an application-specific integrated circuit (ASIC), or other type of circuit. For example, computer code for implementing the encoders 116 may be executed on a computer system (such as a server) residing in the headend 100. Computer code for the decoders 138 and 140, on the other hand, may be executed on the set-top box 134, which constitutes a type of computer system. The code may exist as software programs comprised of program instructions in source code, object code, executable code or other formats.

Figure 1B:
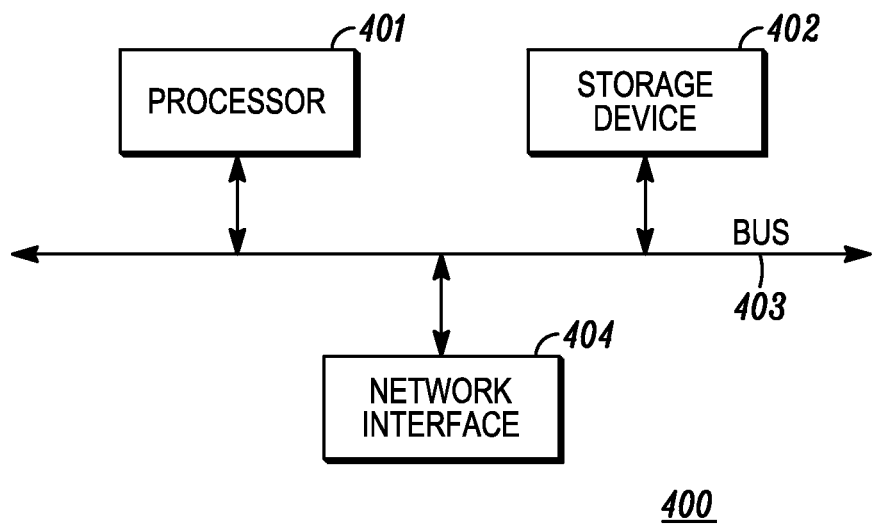
FIG. 1B is a computer system on which embodiments of the invention may be implemented.

FIG. 1B shows an example of a computer system on which computer code for the encoders 116 and the decoders 138 and 140 may be executed. The computer system, generally labeled 400, includes a processor 401, or processing circuitry, that may implement or execute software instructions performing some or all of the methods, functions and other steps described herein. Commands and data from processor 401 are communicated over a communication bus 403. Computer system 400 also includes a computer readable storage device 402, such as random access memory (RAM), where the software and data for processor 401 may reside during runtime. Storage device 402 may also include non-volatile data storage. Computer system 400 may include a network interface 404 for connecting to a network. Other known electronic components may be added or substituted for the components depicted in the computer system 400. The computer system 400 may reside in the headend 100 and execute the encoders 116, and may also be embodied in the set-top box 134 to execute the decoders 138 and 140. Additionally, the computer system 400 may reside in places other than the headend 100 and the set-top box 134, and may be miniaturized so as to be integrated into a smartphone or tablet computer.

Figure 2A:
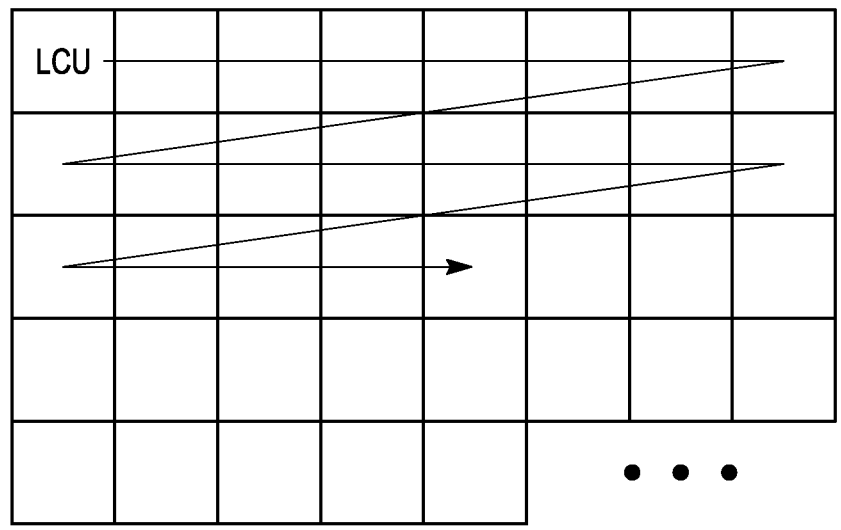
FIGS. 2A, 2B, 3A and 3B illustrate certain video encoding principles according to an embodiment of the invention.
Figure 3A:
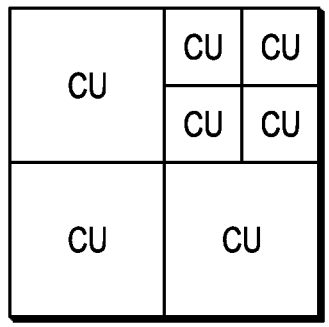

A high-level description of how video data gets encoded and decoded by the encoders 116 and the decoders 138 and 140 in an embodiment of the invention will now be provided. In this embodiment, the encoders and decoders operate according to a High Efficiency Video Coding (HEVC) method. HEVC is a block-based hybrid spatial and temporal predictive coding method. In HEVC, an input picture is first divided into square blocks, called LCUs (largest coding units), as shown in FIG. 2A. Unlike other video coding standards, in which the basic coding unit is a Macroblock of 16×16 pixels, in HEVC, the LCU can be as large as 128×128 pixels. An LCU can be divided into four square blocks, called CUs (coding units), which are a quarter of the size of the LCU. Each CU can be further split into four smaller CUs, which are a quarter of the size of the original CU. The splitting process can be repeated until certain criteria are met. FIG. 3A shows an example of LCU partitioned into CUs.

Figure 3B:
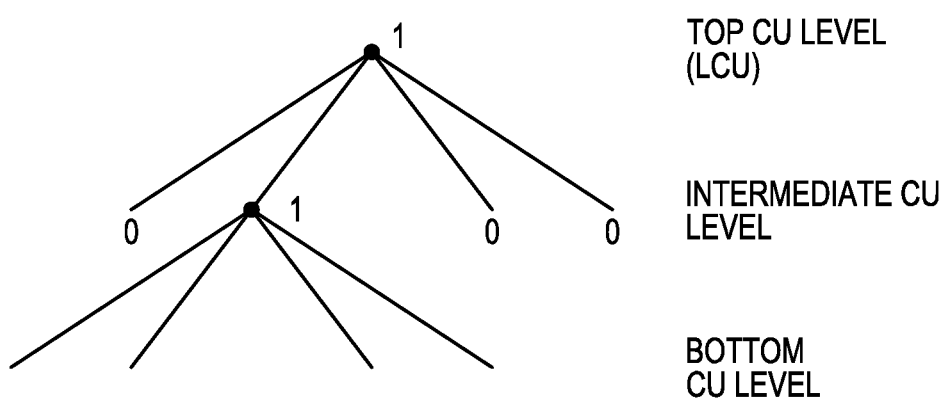

How a particular LCU is split into CUs can be represented by a quadtree. At each node of the quadtree, a flag is set to "1" if the node is further split into sub-nodes. Otherwise, a the flag is unset at "0." For example, the LCU partition of FIG. 3A can be represented by the quadtree of FIG. 3B. These "split flags" are jointly coded with other flags in the video bitstream, including a skip mode flag, a merge mode flag, and a predictive unit (PU) mode flag. In the case of the quadtree of FIG. 3B, the split flags 10100 would be coded as overhead along with the other flags.

Figure 2B:
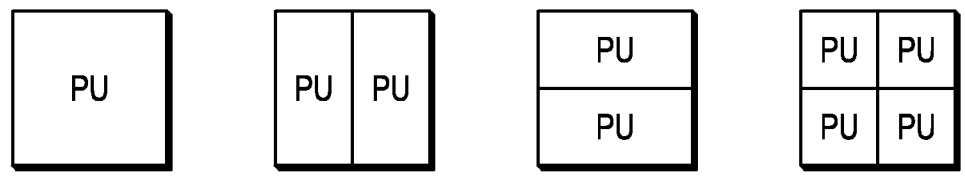

Each CU can be further divided into predictive units (PUs). Thus, at each leaf of a quadtree, a final CU of 2N×2N can possess one of four possible patterns (N×N, N×2N, 2N×N and 2N×2N), as shown in FIG. 2B. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

Figure 5A:
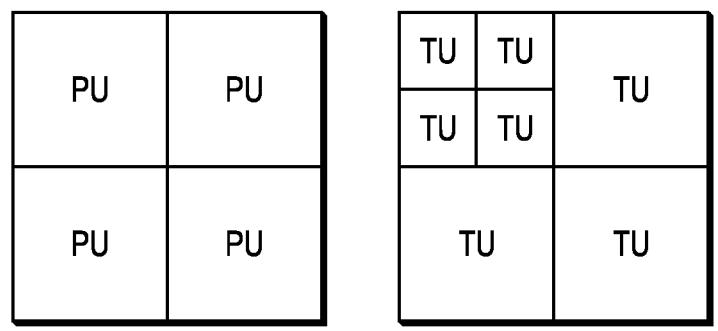
FIGS. 5A and 5B illustrate further video coding principles according to an embodiment of the invention.
Figure 5B:
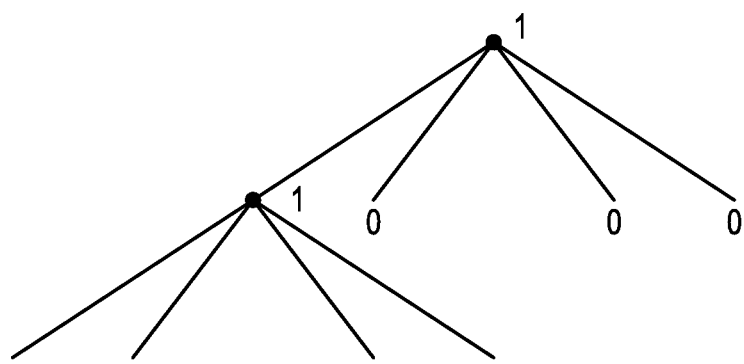

Each CU can also be divided into transform units (TUs) by application of a block transform operation. A block transform operation tends to decorrelate the pixels within the block and compact the block energy into the low order coefficients of the transform block. But, unlike other methods where only one transform of 8×8 or 4×4 is applied to a MB, in the present embodiment, a set of block transforms of different sizes may be applied to a CU, as shown in FIG. 5A where the left block is a CU partitioned into PUs and the right block is the associated set of transform units (TUs). The size and location of each block transform within a CU is described by a separate quadtree, called RQT. FIG. 5B shows the quadtree representation of TUs for the CU in the example of FIG. 5A. In this example, 11000 is coded and transmitted as part of the overhead.

The TUs and PUs of any given CU may be used for different purposes. TUs are typically used for transformation, quantizing and coding operations, while PUs are typically used for spatial and temporal prediction. There is not necessarily a direct relationship between the number of PUs and the number of TUs for a given CU.

Figure 4A:
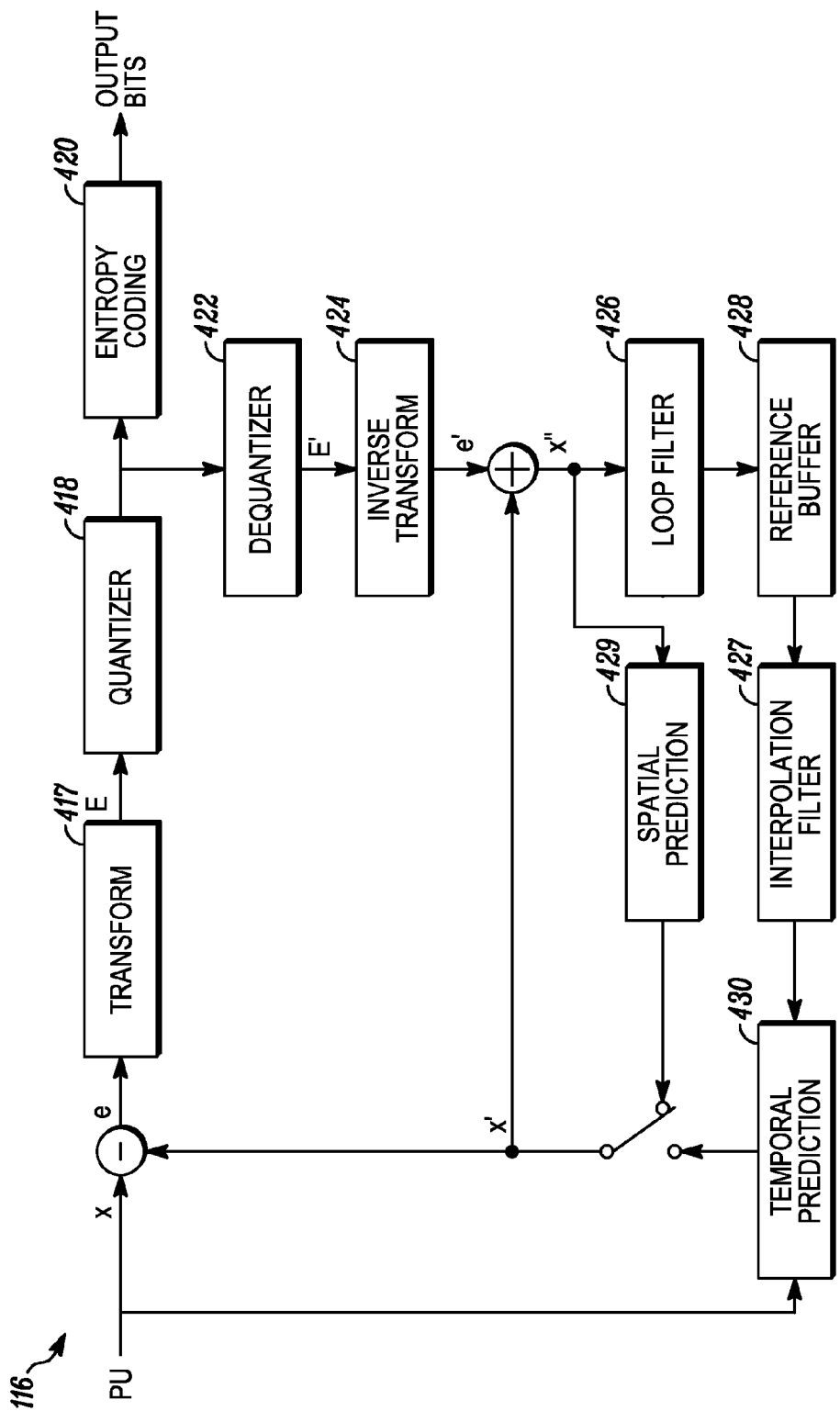
FIGS. 4A and 4B show possible architectures for an encoder and a decoder according to an embodiment of the invention.

Each of the encoders 116 (FIG. 1A) is, according to an embodiment of the invention, composed of several functional modules. These modules are depicted in FIG. 4A. It is understood that these modules may be implemented as hardware, software, or any combination of the two. The input to the encoder 116 of FIG. 4A is a current PU, x. Given the current PU, x, a prediction PU, x', is first obtained through either spatial prediction or temporal prediction. This spatial or temporal prediction is performed by a spatial prediction module 429 or a temporal prediction module 430 respectively.

There are several possible spatial prediction directions that the spatial prediction module 429 can perform per PU, including horizontal, vertical, 45-degree diagonal, 135-degree diagonal, DC, Planar, etc. In one embodiment, the number of Luma intra prediction modes for 4×4, 8×8, 16×16, 32×32, and 64×64 blocks is 18, 35, 35, 35, and 4 respectively. Including the Luma intra modes, an additional mode, called IntraFromLuma, may be used for the Chroma intra prediction mode. A syntax indicates the spatial prediction direction per PU.

The encoder 116 performs temporal prediction through motion estimation operation. In one embodiment, the temporal prediction module 430 (FIG. 4A) searches for a best match prediction for the current PU over reference pictures. The best match prediction is described by motion vector (MV) and associated reference picture (refIdx). A PU in B pictures can have up to two MVs. Both MV and refIdx are part of the syntax in the bitstream.

The prediction PU is then subtracted from the current PU, resulting in the residual PU, e. The residual PU, e, is then transformed by a transform module 417, one transform unit (TU) at a time, resulting in the residual PU in the transform domain, E. To accomplish this task, the transform module 417 uses either a square or a non-square block transform.

Referring back to FIG. 4A, the transform coefficients E, are quantized by a quantizer module 418, converting the high precision transform coefficients into a finite number of possible values. The quantized coefficients are then entropy coded by an entropy coding module 420, resulting in the final compression bits. Two types of entropy coding that may be used are context adaptive variable length coding (CAVLC) and context adaptive binary arithmetic encoding (CABAC). Other types may also be used.

To facilitate temporal and spatial prediction, the encoder 116 also takes the quantized transform coefficients E and dequantizes them with a dequantizer module 422 resulting in the dequantized transform coefficients of E'. The dequantized transform coefficients of E' are then inverse transformed by an inverse transform module 424, resulting in the reconstructed residual PU, e'. The reconstructed residual PU, e', is then added to the corresponding prediction, x', either spatial or temporal, to form a reconstructed PU, x".

Referring still to FIG. 4A, a loop filter operation is performed on the reconstructed PU, x" by a loop filter module 426. One possible way in which this loop filtering operation may be performed is by a deblocking filter operation, which reduces blocking artifacts. Another possible way is by a sample adaptive offset process. Additionally, an adaptive loop filter function may be conditionally performed, which minimizes the coding distortion between the input and output pictures. Any combination of loop filtering operations may also be performed by the loop filter 426. For example, a sample adaptive offset process may be conditionally performed after the completion of a deblocking filter process for the decoded picture, which compensates the pixel value offset between reconstructed pixels and original pixels.

If the reconstructed pictures are reference pictures, they will be stored in a reference buffer 428 for future temporal prediction. From the reference buffer 428, reference pictures are subjected to the operation of an interpolation filter 427. As will be described in more detail, the interpolation filter performs operations that include calculating fractional pixels. The reference pictures are then provided to the temporal prediction module 430.

In an embodiment of the invention, intra pictures (such as an I picture) and inter pictures (such as P pictures or B pictures) are supported by the encoder 116 (FIG. 1A). When implemented according to HEVC, the inter pictures are P or B pictures. An intra picture is coded without referring to other pictures. Hence, spatial prediction is used for a CU/PU inside an intra picture. An intra picture provides a possible point where decoding can begin. On the other hand, an inter picture aims for high compression. Inter picture supports both intra and inter prediction. A CU/PU in inter picture is either spatially or temporally predictive coded. Temporal references are the previously coded intra or inter pictures.

The bits output by the entropy coding module 420 as well as the entropy encoded signs, significance map and non-zero coefficients are inserted into the bitstream by the encoder 116. This bitstream is sent to the decoders 138 and 140 over the HFC network 122 (FIG. 1A). When the decoders 138 and 140 (FIG. 1A) receive the bitstream, they perform the functions shown in FIG. 4B. An entropy decoding module 446 of the decoder 138 decodes the sign values, significance map and non-zero coefficients to recreate the quantized and transformed coefficients. The entropy decoding module 446 then provides the coefficients to a dequantizer module 447, which dequantizes the matrix of coefficients, resulting in E'. The dequantizer module 447 provides the dequantized coefficients to an inverse transform module 448. The inverse transform module 448 performs an inverse transform operation on the coefficients resulting in the reconstructed residual PU, e'. The reconstructed residual PU, e', is then added to the corresponding spatial prediction, x' to form a reconstructed PU, x".

Figure 4B:
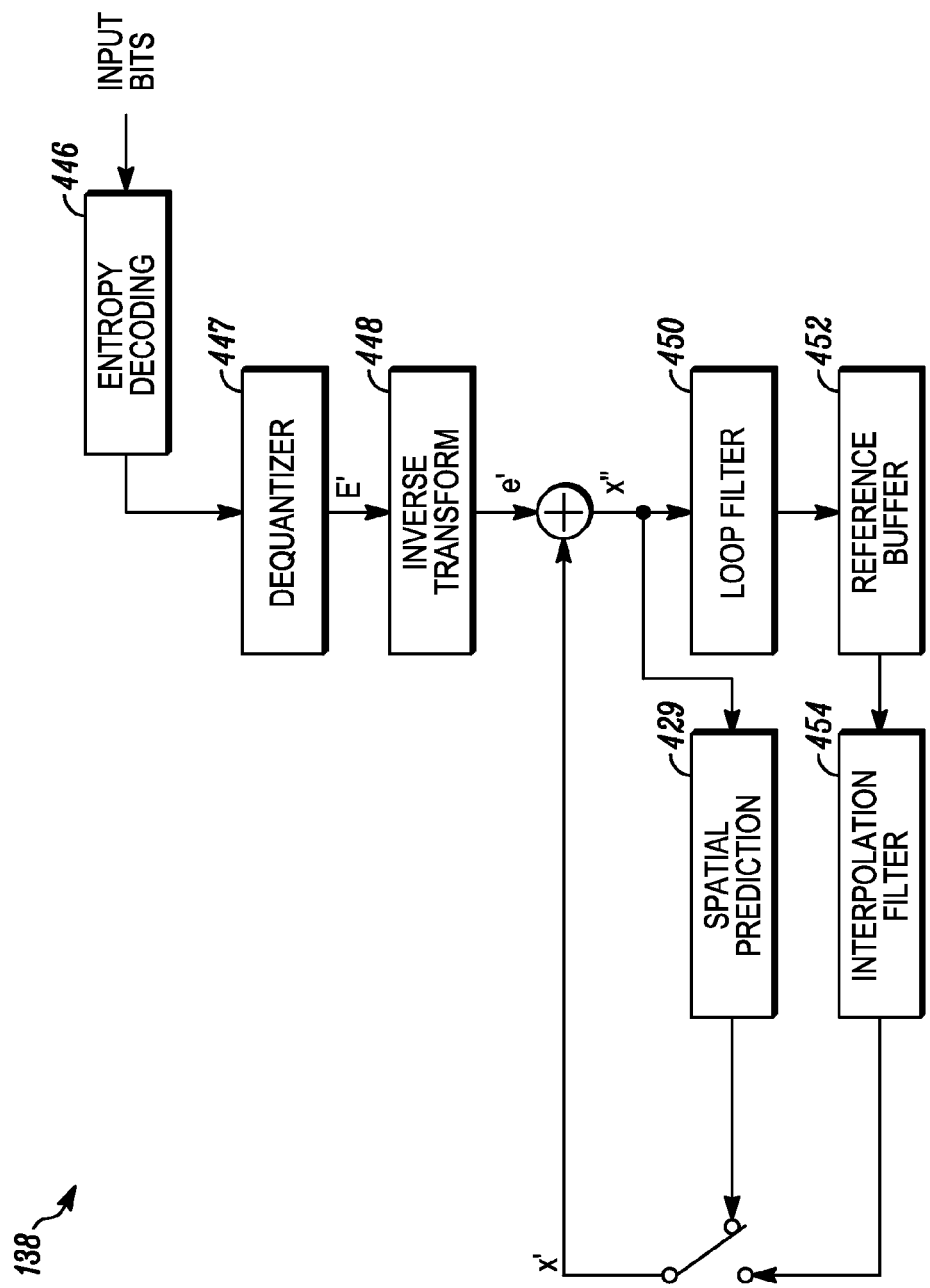

Referring still to FIG. 4B, a loop filter module 450 performs a loop filtering operation on the reconstructed PU. Possible ways in which the loop filtering operation may be performed are discussed previously in conjunction with the loop filtering module 426 of FIG. 4A. If the reconstructed pictures are reference pictures, they will be stored in a reference buffer 452 for future temporal prediction. From the reference buffer 452, reference pictures are subjected to the operation of an interpolation filter 454. As will be described in more detail, the interpolation filter 454 performs operations that include calculating fractional pixels.

Various methods for interpolating fractional pixels according to embodiments of the invention will now be described. These methods may be carried out on the video system of FIG. 1A, the computer system of FIG. 1B, or on any similar system. When implemented in conjunction with the encoder 116 or decoder 138 depicted in FIGS. 4A and 4B, these methods may be carried out by the interpolation filter 427 (FIG. 4A) and the interpolation filter 454 (FIG. 4B). The methods will be described with reference to FIG. 6, which depicts a pixel line. The pixel line includes a first integer pixel (R0), a second integer pixel (L0), a third integer pixel (L1), a fourth integer pixel (R1), a fifth integer pixel (L2), a sixth integer pixel (R2), a seventh integer pixel (L3), an eighth integer pixel (R3), a ninth integer pixel (L4), a tenth integer pixel (R4), an eleventh integer pixel (L5) and a twelfth integer pixel (R6). As can be seen in FIG. 6, the L0 and R0 are between L1 and R1. L1 and R1 are between L2 and R2, L2 and R2 are between L3 and R3, L3 and R3 are between L4 and R4, and L4 and R4 are between L5 and R5.

Between integer pixels L0 and R0 are fractional pixels FL, H and FR. The relative positions of FL, H and FR are not to be taken as limiting. For example, FL and FR may be quarter pixels, eighth pixels, or any other fractional pixel. The pixel line represents pixels of an image that are oriented in a substantially straight line with respect to one another. This line is shown in FIG. 6 as being horizontal. However it is understood that the line may be oriented in any direction, including vertical or diagonal, and may extend to any dimension. Fractional pixels FL and FR are often referred to as "fractional-pel pixels," while fractional pixel H is sometimes referred to "half-pel pixel."

Embodiment I

In this embodiment, the half-pel pixel, H, and fractional-pel pixels, FL and FR, are interpolated using the values of spatial neighboring full-pel pixels, L5, L4, L3, L2, L1, L0, R0, R1, R2, R3, R4, and R5, as follows, FL=(FLW$_{L5}$*L5+FLW$_{L4}$*L4+FLW$_{L3}$*L3+FLW$_{L2}$*L2+ FLW$_{L1}$*L1+FLW$_{L0}$*L0+FLW$_{R0}$*R0+FLW$_{R1}$*R1+ FLW$_{R2}$*R2+FLW$_{R3}$*R3+FLW$_{R4}$*R4+FLRoundingOffset)>>FLRightShiftBits;

H=(HW$_{L5}$*L5+HW$_{L4}$*L4+HW$_{L3}$*L3+HW$_{L2}$*L2+ HW$_{L1}$*L1+HW$_{L0}$*L0+HW$_{R0}$*R0+HW$_{R1}$*R1+HW$_{R2}$*R2+ HW$_{R3}$*R3+HW$_{R4}$*R4+HW$_{R5}$*R5+HRoundingOffset)>> HRightShiftBits;

FR=(FRW$_{L4}$*L4+FRW$_{L3}$*L3+FRW$_{L2}$*L2+FRW$_{L1}$*L1+ FRW$_{L0}$*L0+FRW$_{R0}$*R0+FRW$_{R1}$*R1+FRW$_{R2}$*R2+ FRW$_{R3}$*R3+FRW$_{R4}$*R4+FRW$_{R5}$*R5+FRRoundingOffset)>>FRRightShiftBits.

Here, FLW$_{L5}$, FLW$_{L4}$, . . . , and FLW$_{R4}$ are the weighting factors of L5, L4, . . . , and R4 when interpolating FL. FLRoundingOffset is the rounding offset when interpolating FL. FLRightShiftBits is the number of right shift bits when interpolating FL. HW$_{L5}$, HW$_{L4}$, . . . , and HW$_{R5}$ are the weighting factors of L5, L4, . . . , and R5 when interpolating H. HRoundingOffset is the rounding offset when interpolating H. HRightShiftBits is the number of right shift bits when interpolating H. FRW$_{L4}$, FRW$_{L3}$, . . . , and FRW$_{R5}$ are the weighting factors of L4, L3, . . . , and R5 when interpolating FR. FRRoundingOffset is the rounding offset when interpolating FR. FRRightShiftBits is the number of right shift bits when interpolating FR. In this embodiment, 12 integer pixels are used for half-pel interpolation and 11 integer pixels are used for fractional-pel interpolation.

Embodiment II

In this embodiment, the half-pel pixel, H, and fractional-pel pixels, FL and FR, are interpolated using the values of spatial neighboring full-pel pixels, L4, L3, L2, L1, L0, R0, R1, R2, R3, and R4, as follows, FL=(FLW$_{L4}$*L4+FLW$_{L3}$*L3+FLW$_{L2}$*L2+FLW$_{L1}$*L1+ FLW$_{L0}$*L0+FLW$_{R0}$*R0+FLW$_{R1}$*R1+FLW$_{R2}$*R2+ FLW$_{R3}$*R3+FLRoundingOffset)>>FLRightShiftBits;

H=(HW$_{L4}$*L4+HW$_{L3}$*L3+HW$_{L2}$*L2+HW$_{L1}$*L1+ HW$_{L0}$*L0+HW$_{R0}$*R0+HW$_{R1}$*R1+HW$_{R2}$*R2+HW$_{R3}$*R3+ HW$_{R4}$*R4+HRoundingOffset)>>HRightShiftBits;

FR=(FRW$_{L3}$*L3+FRW$_{L2}$*L2+FRW$_{L1}$*L1+FRW$_{L0}$*L0+ FRW$_{R0}$*R0+FRW$_{R1}$*R1+FRW$_{R2}$*R2+FRW$_{R3}$*R3+ FRW$_{R4}$*R4+FRRoundingOffset)>>FRRightShiftBits.

Here, FLW$_{L4}$, FLW$_{L3}$, . . . , and FLW$_{R3}$ are the weighting factors of L4, L3, . . . , and R3 when interpolating FL. FLRoundingOffset is the rounding offset when interpolating FL. FLRightShiftBits is the number of right shift bits when interpolating FL. HW$_{L4}$, HW$_{L3}$, . . . , and HW$_{R4}$ are the weighting factors of L4, L3, . . . , and R4 when interpolating H. HRoundingOffset is the rounding offset when interpolating H. HRightShiftBits is the number of right shift bits when interpolating H. FRW$_{L3}$, FRW$_{L2}$, . . . , and FRW$_{R4}$ are the weighting factors of L3, L2, . . . , and R4 when interpolating FR. FRRoundingOffset is the rounding offset when interpolating FR. FRRightShiftBits is the number of right shift bits when interpolating FR. In this embodiment, 10 integer pixels are used for half-pel interpolation and 9 integer pixels are used for fractional-pel interpolation.

Embodiment III

In this embodiment, the half-pel pixel, H, and fractional-pel pixels, FL and FR, are interpolated using the values of spatial neighboring full-pel pixels, L3, L2, L1, L0, R0, R1, R2, and R3, as follows, $FL = (FLW_{L3}*L3 + FLW_{L2}*L2 + FLW_{L1}*L1 + FLW_{L0}*L0 + FLW_{R0}*R0 + FLW_{R1}*R1 + FLW_{R2}*R2 + FLRoundingOffset) >> FLRightShiftBits;$ $H = (HW_{L3}*L3 + HW_{L2}*L2 + HW_{L1}*L1 + HW_{L0}*L0 + HW_{R0}*R0 + HW_{R1}*R1 + HW_{R2}*R2 + HW_{R3}*R3 + HRoundingOffset) >> HRightShiftBits;$ $FR = (FRW_{L2}*L2 + FRW_{L1}*L1 + FRW_{L0}*L0 + FRW_{R0}*R0 + FRW_{R1}*R1 + FRW_{R2}*R2 + FRW_{R3}*R3 + FRRoundingOffset) >> FRRightShiftBits.$ Here, $FLW_{L3}, FLW_{L2}, \ldots,$ and $FLW_{R2}$ are the weighting factors of L3, L2, ..., and R2 when interpolating FL. FLRoundingOffset is the rounding offset when interpolating FL. FLRightShiftBits is the number of right shift bits when interpolating FL. $HW_{L3}, HW_{L2}, \ldots,$ and $HW_{R3}$ are the weighting factors of L3, L2, ..., and R3 when interpolating H. HRoundingOffset is the rounding offset when interpolating H. HRightShiftBits is the number of right shift bits when interpolating H. $FRW_{L2}, FRW_{L1}, \ldots,$ and $FRW_{R3}$ are the weighting factors of L2, L1, ..., and R3 when interpolating FR. FRRoundingOffset is the rounding offset when interpolating FR. FRRightShiftBits is the number of right shift bits when interpolating FR. In this embodiment, 8 integer pixels are used for half-pel interpolation and 7 integer pixels are used for fractional-pel interpolation.

Embodiment IV

In this embodiment, the half-pel pixel, H, and fractional-pel pixels, FL and FR, are interpolated using the values of spatial neighboring full-pel pixels, L2, L1, L0, R0, R1, and R2, as follows, $FL = (FLW_{L2}*L2 + FLW_{L1}*L1 + FLW_{L0}*L0 + FLW_{R0}*R0 + FLW_{R1}*R1 + FLRoundingOffset) >> FLRightShiftBits;$ $H = (HW_{L2}*L2 + HW_{L1}*L1 + HW_{L0}*L0 + HW_{R0}*R0 + HW_{R1}*R1 + HW_{R2}*R2 + HRoundingOffset) >> HRightShiftBits;$ $FR = (FRW_{L1}*L1 + FRW_{L0}*L0 + FRW_{R0}*R0 + FRW_{R1}*R1 + FRW_{R2}*R2 + FRRoundingOffset) >> FRRightShiftBits.$ Here, $FLW_{L2}, FLW_{L1}, \ldots,$ and $FLW_{R1}$ are the weighting factors of L2, L1, ..., and R1 when interpolating FL. FLRoundingOffset is the rounding offset when interpolating FL. FLRightShiftBits is the number of right shift bits when interpolating FL. $HW_{L2}, HW_{L1}, \ldots,$ and $HW_{R2}$ are the weighting factors of L2, L1, ..., and R2 when interpolating H. HRoundingOffset is the rounding offset when interpolating H. HRightShiftBits is the number of right shift bits when interpolating H. $FRW_{L1}, FRW_{L0}, \ldots,$ and $FRW_{R2}$ are the weighting factors of L1, L10, ..., and R2 when interpolating FR. FRRoundingOffset is the rounding offset when interpolating FR. FRRightShiftBits is the number of right shift bits when interpolating FR. In this embodiment, 6 integer pixels are used for half-pel interpolation and 5 integer pixels are used for fractional-pel interpolation.

Embodiment V

In this embodiment, the half-pel pixel, H, and fractional-pel pixels, FL and FR, are interpolated using the values of spatial neighboring full-pel pixels, L1, L0, R0, and R1, as follows, $FL = (FLW_{L1}*L1 + FLW_{L0}*L0 + FLW_{R0}*R0 + FLRoundingOffset) >> FLRightShiftBits;$ $H = (HW_{L1}*L1 + HW_{L0}*L0 + HW_{R0}*R0 + HW_{R1}*R1 + HRoundingOffset) >> HRightShiftBits;$ $FR = (FRW_{L0}*L0 + FRW_{R0}*R0 + FRW_{R1}*R1 + FRRoundingOffset) >> FRRightShiftBits.$ Here, $FLW_{L1}, FLW_{L0},$ and $FLW_{R0}$ are the weighting factors of L1, L0, ..., and R0 when interpolating FL. FLRoundingOffset is the rounding offset when interpolating FL. FLRightShiftBits is the number of right shift bits when interpolating FL. $HW_{L1}, HW_{L0}, HW_{R0},$ and $HW_{R1}$ are the weighting factors of L1, L0, R0, and R1 when interpolating H. HRoundingOffset is the rounding offset when interpolating H. HRightShiftBits is the number of right shift bits when interpolating H. $FRW_{L0}, FRW_{R0},$ and $FRW_{R1}$ are the weighting factors of L0, R0, and R1 when interpolating FR. FRRoundingOffset is the rounding offset when interpolating FR. FRRightShiftBits is the number of right shift bits when interpolating FR. In this embodiment, 4 integer pixels are used for half-pel interpolation and 3 integer pixels are used for fractional-pel interpolation.

In image and video compression, it might be desirable to have an even symmetric interpolation filter for interpolating half-pel pixels. Also, it might be desirable that the quarter-pel filters are reflections of one other. This may ensure linear (or zero) phase filtering in the overall interpolation. For example, referring to FIG. 6, assuming FL is the quarter pixel between L0 and H, and FR is the quarter pixel between H and R0, applying of the two constraints on Embodiment I makes the relationships between the fractional pixel weighting factors as shown in Table 1:

TABLE 1

| | |
|---|---|
| $HW_{L5} = HW_{R5}$ | $FLW_{L5} = FRW_{R5}$ |
| $HW_{L4} = HW_{R4}$ | $FLW_{L4} = FRW_{R4}$ |
| $HW_{L3} = HW_{R3}$ | $FLW_{L3} = FRW_{R3}$ |
| $HW_{L2} = HW_{R2}$ | $FLW_{L2} = FRW_{R2}$ |
| $HW_{L1} = HW_{R1}$ | $FLW_{L1} = FRW_{R1}$ |
| $HW_{L0} = HW_{R0}$ | $FLW_{L0} = FRW_{R0}$ |
| | $FLW_{R0} = FRW_{L0}$ |
| | $FLW_{R1} = FRW_{L1}$ |
| | $FLW_{R2} = FRW_{L2}$ |
| | $FLW_{R3} = FRW_{L3}$ |
| | $FLW_{R4} = FRW_{L4}$ |

A specific interpolation filter may work well for certain types of video contents. It might be preferable to adaptively choose the interpolation filter(s). Thus, different interpolation filter(s) may be used for different video sequences.

In addition, the characteristics of the pixels along the horizontal lines and the vertical lines may be very different. Hence, separable filters may be employed in the horizontal and vertical directions. The separable horizontal and vertical filters may not necessarily the same, depending upon the video content. For example, a coding unit or a picture with mostly horizontal detail could use a stronger vertical filter, etc.

The filter selection information can be signaled explicitly, or derived implicitly, at sequence, picture, slice or even CU level.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A method for interpolating a first fractional pixel FL, a half pixel H, and a second fractional pixel FR located between a first integer pixel L0 and a second integer pixel R0 along a pixel line, wherein the pixel line further includes a third integer pixel L1, a fourth integer pixel R1, a fifth integer pixel L2, a sixth integer pixel R2, a seventh integer pixel L3, an eighth integer pixel R3, a ninth integer pixel L4, a tenth integer pixel R4, an eleventh integer pixel L5, and a twelfth integer pixel R5, the method comprising:
   selecting a first set of integer pixels along the pixel line, the first set consisting of the seventh integer pixel L3, the fifth integer pixel L2, the third integer pixel L1, the first integer pixel L0, the second integer pixel R0, the fourth integer pixel R1, the sixth integer pixel R2, the eleventh integer pixel L5, the ninth integer pixel L4, the eighth integer pixel R3 and the tenth integer pixel R4;
   selecting a second set of integer pixels along the pixel line, the second set consisting of the seventh integer pixel L3, the fifth integer pixel L2, the third integer pixel L1, the first integer pixel L0, the second integer pixel R0, the fourth integer pixel R1, the sixth integer pixel R2, the eighth integer pixel R3, the eleventh integer pixel L5, the ninth integer pixel L4, the tenth integer pixel R4 and the twelfth integer pixel R5;
   selecting a third set of integer pixels along the pixel line the third set consisting of the fifth integer pixel L2, the third integer pixel L1, the first integer pixel L0, the second integer pixel R0, the fourth integer pixel R1, the sixth integer pixel R2, the eighth integer pixel R3, the ninth integer pixel L4, the seventh integer pixel L3, the tenth integer pixel R4 and the twelfth integer pixel R5,
   wherein the first integer pixel L0 and the second integer pixel R0 are between the third integer pixel L1 and the fourth integer pixel R1, the third integer pixel L1 and the fourth integer pixel R1 are between the fifth integer pixel L2 and the sixth integer pixel R2, the fifth integer pixel L2 and the sixth integer pixel R2 are between the seventh integer pixel L3 and the eighth integer pixel R3, the seventh integer pixel L3 and the eighth integer pixel R3 are between the ninth integer pixel L4 and the tenth integer pixel R4, the ninth integer pixel L4 and the tenth integer pixel R4 are between the eleventh integer pixel L5 and the twelfth integer pixel R5;
   calculating a value for the first fractional pixel FL based on values of the pixels of the first set;
   calculating a value for the half pixel H based on values of the pixels in the second set;
   calculating a value for the second fractional pixel FR based on values of the pixels in the third set,
   wherein the steps of calculating a value for the first fractional pixel FL, the half pixel H, and the second fractional pixel FR comprise calculating FL, H and FR, respectively, based on:
   $$FL=(FLW_{L5}*L5+FLW_{L4}*L4+FLW_{L3}*L3+FLW_{L2}*L2+FLW_{L1}*L1+FLW_{L0}*L0+FLW_{R0}*R0+FLW_{R1}*R1+FLW_{R2}*R2+FLW_{R3}*R3+FLW_{R4}*R4+FLRoundingOffset)\!>\!>\!FLRightShiftBits;$$
   $$H=(HW_{L5}*L5+HW_{L4}*L4+HW_{L3}*L3+HW_{L2}*L2+HW_{L1}*L1+HW_{L0}*L0+HW_{R0}*R0+HW_{R1}*R1+HW_{R2}*R2+HW_{R3}*R3+HW_{R4}*R4+HW_{R5}*R5+HRoundingOffset)\!>\!>\!HRightShiftBits;$$
   $$FR=(FRW_{L4}*L4+FRW_{L3}*L3+FRW_{L2}*L2+FRW_{L1}*L1+FRW_{L0}*L0+FRW_{R0}*R0+FRW_{R1}*R1+FRW_{R2}*R2+FRW_{R3}*R3+FRW_{R4}*R4+FRW_{R5}*R5+FRRoundingOffset)\!>\!>\!FRRightShiftBits;$$
   wherein $FLW_{L5}$, $FLW_{L4}$, $FLW_{L3}$, $FLW_{L2}$, $FLW_{L1}$, $FLW_{L0}$, $FLW_{R0}$, $FLW_{R1}$, $FLW_{R2}$, $FLW_{R3}$, and $FLW_{R4}$ are the weighting factors of L5, L4 L3, L2, L1, L0, R0, R1, R2, R3 and R4 respectively, FLRoundingOffset is the rounding offset, and FLRightShiftBits is the number of right shift bits;
   wherein $HW_{L5}$, $HW_{L4}$, $HW_{L3}$, $HW_{L2}$, $HW_{L1}$, $HW_{L0}$, $HW_{R0}$, $HW_{R1}$, $HW_{R2}$, $HW_{R3}$, $HW_{R4}$, and $HW_{R5}$ are the weighting factors of L5, L4, L3, L2, L1, L0, R0, R1, R2, R3, R4 and R5 respectively, HRoundingOffset is the rounding offset, HRightShiftBits is the number of right shift bits; and
   wherein $FRW_{L4}$, $FRW_{L3}$, $FRW_{L2}$, $FRW_{L1}$, $FRW_{L0}$, $FRW_{R0}$, $FRW_{R1}$, $FRW_{R2}$, $FRW_{R3}$, $FRW_{R4}$ and $FRW_{R5}$ are the weighting factors of L4, L3, L2, L1, L0, R0, R1, R2, R3, R4 and R5 respectively, FRRoundingOffset is the rounding offset, FRRightShiftBits is the number of right shift bits.

2. The method of claim 1,
   wherein $HW_{L5}=HW_{R5}$, $HW_{L4}=HW_{R4}$, $HW_{L3}=HW_{R3}$, $HW_{L2}=HW_{R2}$, $HW_{L1}=HW_{R1}$, and $HW_{L0}=HW_{R0}$, and wherein $FLW_{L5}=FRW_{R5}$, $FLW_{L4}=FRW_{R4}$, $FLW_{L3}=FRW_{R3}$, $FLW_{L2}=FRW_{R2}$, $FLW_{L1}=FRW_{R1}$, $FLW_{L0}=FRW_{R0}$, $FLW_{R0}=FRW_{L0}$, $FLW_{R1}=FRW_{L1}$, $FLW_{R2}=FRW_{L2}$, $FLW_{R3}=FRW_{L3}$, $FLW_{R4}=FRW_{L4}$.

3. A video processing system, the system comprising:
   a processor that executes instructions for performing steps comprising:
   reading a pixel line comprising a first integer pixel L0, a second integer pixel R0, a third integer pixel L1, a fourth integer pixel R1, a fifth integer pixel L2, a sixth integer pixel R2, a seventh integer pixel L3, an eighth integer pixel R3, a ninth integer pixel L4, tenth integer pixel R4, eleventh integer pixel L5, and twelfth integer pixel R5,
   selecting a first set of integer pixels along the pixel line, the first set consisting of the seventh integer pixel L3, the fifth integer pixel L2, the third integer pixel L1, the first integer pixel L0, the second integer pixel R0, the fourth integer pixel R1, the sixth integer pixel R2, the eleventh integer pixel L5, the ninth integer pixel L4, the eighth integer pixel R3 and the tenth integer pixel R4;
   selecting a second set of integer pixels along the pixel line, the second set consisting of the seventh integer pixel L3, the fifth integer pixel L2, the third integer pixel L1, the first integer pixel L0, the second integer pixel R0, the fourth integer pixel R1, the sixth integer pixel R2, the eighth integer pixel R3, the eleventh integer pixel L5, the ninth integer pixel L4, the tenth integer pixel R4 and the twelfth integer pixel R5;
   selecting a third set of integer pixels along the pixel line the third set consisting of the fifth integer pixel L2, the third integer pixel L1, the first integer pixel L0, the second integer pixel R0, the fourth integer pixel R1, the sixth integer pixel R2, the eighth integer pixel R3 the ninth integer pixel L4, the seventh integer pixel L3, the tenth integer pixel R4 and the twelfth integer pixel R5,
   wherein the first integer pixel L0 and the second integer pixel R0 are between the third integer pixel L1 and the fourth integer pixel R1, the third integer pixel L1 and the fourth integer pixel R1 are between the fifth integer pixel L2 and the sixth integer pixel R2, the fifth integer pixel L2 and the sixth integer pixel R2 are between the seventh integer pixel L3 and the eighth integer pixel R3, the seventh integer pixel L3 and the eighth integer pixel R3 are between the ninth integer pixel L4 and the tenth integer pixel R4, and the ninth integer pixel L4 and the tenth integer pixel R4 are between the eleventh integer pixel L5 and the twelfth integer pixel R5;

calculating a value for a first fractional pixel FL located between the first integer pixel L0 and the second integer pixel R0 based on values of the pixels of the first set;

calculating a value for a half pixel H located between the first integer pixel L0 and the second integer pixel R0 based on values of the pixels in the second set;

calculating a value for a second fractional pixel FR located between the first integer pixel L0 and the second integer pixel R0 based on values of the pixels in the third set, wherein the steps of calculating a value for the first fractional pixel FL, the half pixel H, and the second fractional pixel FR comprise calculating FL, H and FR, respectively, based on:

FL=(FLW$_{L5}$*L5+FLW$_{L4}$*L4+FLW$_{L3}$*L3+FLW$_{L2}$*L2+FLW$_{L1}$*L1+FLW$_{L0}$*L0+FLW$_{R0}$*R0+FLW$_{R1}$*R1+FLW$_{R2}$*R2+FLW$_{R3}$*R3+FLW$_{R4}$*R4+FLRoundingOffset)>>FLRightShiftBits;

H=(HW$_{L5}$*L5+HW$_{L4}$*L4+HW$_{L3}$*L3+HW$_{L2}$*L2+HW$_{L1}$*L1+HW$_{L0}$*L0+HW$_{R0}$*R0+HW$_{R1}$*R1+HW$_{R2}$*R2+HW$_{R3}$*R3+HW$_{R4}$*R4+HW$_{R5}$*R5+HRoundingOffset)>>HRightShiftBits;

FR=(FRW$_{L4}$*L4+FRW$_{L3}$*L3+FRW$_{L2}$*L2+FRW$_{L1}$*L1+FRW$_{L0}$*L0+FRW$_{R0}$*R0+FRW$_{R1}$*R1+FRW$_{R2}$*R2+FRW$_{R3}$*R3+FRW$_{R4}$*R4+FRW$_{R5}$*R5+FRRoundingOffset)>>FRRightShiftBits;

wherein FLW$_{L5}$, FLW$_{L4}$, FLW$_{L3}$, FLW$_{L2}$, FLW$_{L1}$, FLW$_{L0}$, FLW$_{R1}$, FLW$_{R}$, FLW$_{R2}$, FLW$_{R3}$, and FLW$_{R4}$ are the weighting factors of L5, L4, L3, L2, L1, L0, R0, R1, R2, R3 and R4 respectively, FLRoundingOffset is the rounding offset, and FLRightShiftBits is the number of right shift bits;

wherein HW$_{L5}$, HW$_{L4}$, HW$_{L3}$, HW$_{L2}$, HW$_{L1}$, HW$_{L0}$, HW$_{R0}$, HW$_{R1}$, HW$_{R2}$, HW$_{R3}$, HW$_{R4}$, and HW$_{R5}$ are the weighting factors of L5, L4, L3, L2, L1, L0, R0, R1, R2, R3, R4 and R5 respectively, HRoundingOffset is the rounding offset, HRightShiftBits is the number of right shift bits; and wherein FRW$_{L4}$, FRW$_{L3}$, FRW$_{L2}$, FRW$_{L1}$, FRW$_{L0}$, FRW$_{R0}$, FRW$_{R}$, FRW$_{R2}$, FRW$_{R3}$, FRW$_{R4}$ and FRW$_{R5}$ are the weighting factors of L4, L3, L2, L1, L0, R0, R1, R2, R3, R4 and R5 respectively, FRRoundingOffset is the rounding offset, FRRightShiftBits is the number of right shift bits.

4. The system of claim 3, wherein HW$_{L5}$=HW$_{R5}$, HW$_{L4}$=HW$_{R4}$, HW$_{L3}$=HW$_{R3}$, HW$_{L2}$=HW$_{R2}$, HW$_{L1}$=HW$_{R1}$, and HW$_{L0}$=HW$_{R0}$, and wherein FLW$_{L5}$=FRW$_{R5}$, FLW$_{L4}$=FRW$_{R4}$, FLW$_{L3}$=FRW$_{R3}$, FLW$_{L2}$=FRW$_{R2}$, FLW$_{L1}$=FRW$_{R1}$, FLW$_{L0}$=FRW$_{R0}$, FLW$_{R0}$=FRW$_{L0}$, FLW$_{R1}$=FRW$_{L1}$, FLW$_{R2}$=FRW$_{L2}$, FLW$_{R3}$=FRW$_{L3}$, FLW$_{R4}$=FRW$_{L4}$.

\* \* \* \* \*